Jan. 15, 1963   F. A. FLANNERY   3,073,186
MICROMETRICALLY ADJUSTABLE INSERT FOR BORING BAR
Filed July 1, 1959

INVENTOR.
FRANK A. FLANNERY
BY
*J. William Freeman*
ATTORNEY

United States Patent Office 3,073,186
Patented Jan. 15, 1963

3,073,186
MICROMETRICALLY ADJUSTABLE INSERT
FOR BORING BAR
Frank A. Flannery, 2424 Thurmont Road,
Akron 13, Ohio
Filed July 1, 1959, Ser. No. 824,397
1 Claim. (Cl. 77—58)

This invention relates to the art of machine tools and in particular relates to an improved type of cutting tool that is designed for use with conventional boring bars and which is characterized by being micrometrically adjustable with respect to its radial projection beyond the axis of rotation of said boring bars.

In the art of boring bars, it has long been known that a cutting tool can be set at right angles to the axis of rotation of the boring bar and project beyond the same for boring a circle of certain diameter.

In the normal instance, such boring bars are normally provided with a square opening with a set screw leading into the opening for the purpose of adjustably securing the cutting tool therein. In use of such prior art devices, the operator obtains the proper cutting diameter on a cut-and-try basis and continually loosens the set screw and taps the cutting tool until the right radial position is attained.

In recent years, there have been developed improved types of boring bars featuring adjustable cutting inserts and representative patents illustrating these devices are De Vlieg 2,330,692, 2,537,517 and 2,652,634. While the above captioned tools have permitted accurate setting of the extent of projection of the cutting tools, the same have been rather expensive in nature because of the fact that the same require special components and do not lend themselves to adaptability with existing boring bar structures.

More specifically, the De Vlieg structures employ one or more sleeves that fit within a circular bore and which are provided with antirotational devices, with the sleeves being adjustable axially of the bore and with the tool being drawn into the sleeve during usage.

It has been discovered that highly simplified types of micrometrically adjustable boring tool can be provided by providing a square tool that is designed to be received within the conventional opening that exists in the majority of boring bars, with this tool having threaded corners and being received in an adjustment nut that serves to align the same and simultaneously clamp the same against movement relatively of the bore.

Production of an improved boring tool having the above features is accordingly the principal object of this invention, with other objects becoming more apparent upon a reading of the following brief specification, considered and interpreted in the light of the accompanying drawings.

Figure 1:
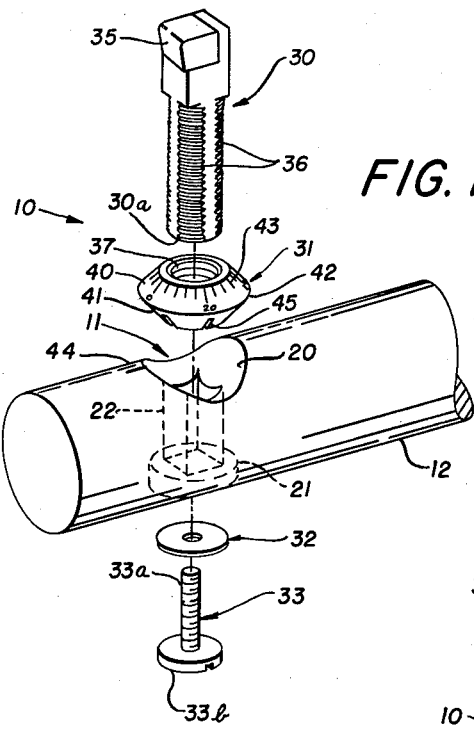
FIGURE 1 is an exploded perspective view of the improved boring bar.

Referring now to the drawings and in particular to FIGURE 1 thereof, the improved insert, generally designated by the numeral 10, is shown received within the opening 11 of a boring bar 12 so as to be disposed at right angles to the axis of rotation thereof.

Considering first the structure of the boring bar 12, it will be seen from the drawings that the same is illustrated in the preferred embodiment as being of elongate cylindrical configuration and including a cross-bore or opening 11; the arrangement being such that the opening 11 preferably includes a tapered portion 20, a counter-bore portion 21 and a central portion 22, with the bores 20 and 21 being preferably of cylindrical cross-section, while the bore 22 is preferably of square cross-section, as shown in the drawings.

The insert unit 10 per se is made up of a cutting tool 30, an adjustment nut 31, a washer 32 and a bolt 33, with these component parts being connected for coaction together in the manner that will now be described.

Figure 2:
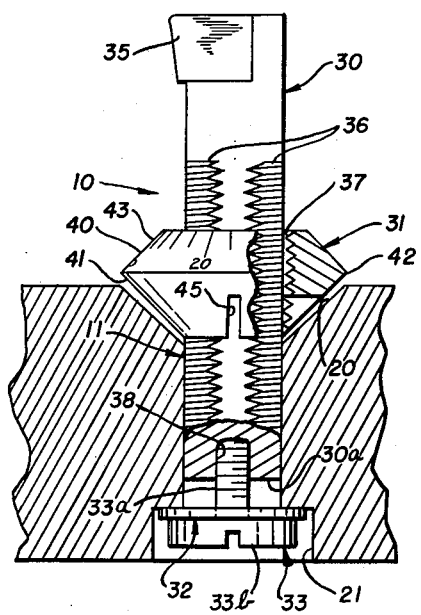
FIGURE 2 is a fragmentary transverse section showing the position of the component parts in the adjustable condition thereof.
Figure 3:
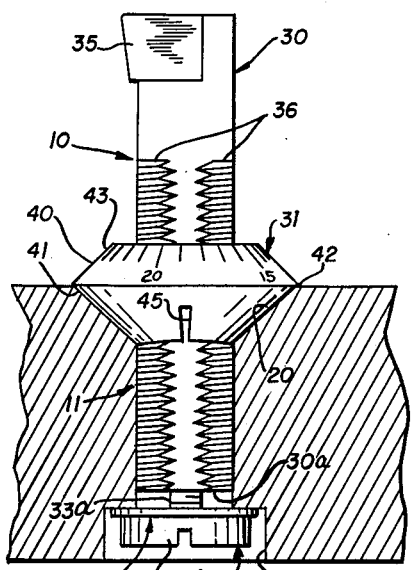
FIGURE 3 is a view similar to FIGURE 2 but showing the position of the component parts in their tightened condition.

To this end and referring to FIGURE 2, the tool body 30 is shown somewhat elongated and being of preferably square cross sectional configuration so as to be shiftable axially of the square bore 22 while being non-rotatable therein, as is clearly shown in FIGURES 2 and 3. Additionally, the tool 30 includes a cutting tip 35 and a plurality of threaded edge surfaces 36, 36, with these edge surfaces 36, 36 being designed for reception within the threaded bore 37 of the adjustment nut 31. Also, the end 30a of the tool that is opposed to the end carrying the cutting bit 35, is shown provided with a tapped aperture 38 that receives the threaded shank 33a of bolt 33.

Considering next the structure of the adjustment nut 31, it will first be seen that the same is of generally cylindrical configuration and includes tapering surfaces 40 and 41 that come together to define a maximum diameter region 42, with surface 41 being intended to seat against tapered bore 20, while surface 40 is provided with indicia 43, 43 for the purpose of determining adjustment, it being understood that a mark 44 will be provided on the bar 12 for calibration purposes.

As has been previously indicated, it is intended that the adjustment nut 31 serve the dual purpose of (1) shifting the tool body 30 relatively of bar 12 and (2) retaining the same in the shifted condition by locking the same against axial movement in bore 11. To this end, the angle of taper of the tapered surface 41 is shown as being slightly different from the angle of taper of the bore 20 and, in this fashion, as the adjustment nut 31 is drawn into the bore 20, there will be somewhat of a radial collapse of the tapered portion 41 with such collapse being permitted by the axially extending slot 45 that is provided therein as shown in the drawings.

In use or operation of the improved boring bar tool, it is merely necessary that the boring bar 12 first be provided with the bores 20 and 21, as by the use of a tapered bit and a counter-bore tool in known fashion.

At this point, the tool body 30 may have the internal threads 37 thereof threadingly engaged with the threaded edges 36, 36 of the tool body 30 and, at this time, the end 30a of the just described assembly may be positioned in the square bore 22. Following such insertion, the washer 32 may be passed over the shank 33a of bolt 33, followed by insertion of the projecting end of the shank 33a into threaded engagement with the tapped aperture 38.

At this time, the component parts will be positioned substantially as shown in FIGURE 2, with surface 41 of adjustment nut 31 being loosely seated against tapered bore 20, while washer 32 will be loosely bearing against the shoulder 24 that is defined by counter-bore 21.

Upon tightening of head 33b, the tool body 30 and adjustment nut 31 will be drawn into bore 11 and will be seated therein as shown in FIGURE 2, and at this time, the tool is ready for use.

When it is desired to adjust the radial projection of tip 35, it is merely necessary that a dimension be taken as to the existing diameter presently being created by the tool and, in the event it is desired to radially expand the amount of cut taken by the tool, it is merely necessary that the head 33b be unloosened, at which time the adjustment nut 31 can be rotated about its axis. Such rotation in the proper direction will cause the tool to move relatively of the nut 31 in an axial direction such as upwardly in FIGURES 2 and 3, with the extent of such movement being determined by reading of the graduations 43, 43 that are provided. When the proper amount of movement has been effectuated, it is merely necessary to retighten the head 33b, at which time the nut 31 and tool body 30 will be reset, with the cutting edge of tool bit 35 having been adjusted by the amount indicated by the calibrations 43, 43.

In this regard, it is important to note that the dimensional change obtained will at all times be accurate due to the fact that the dimension is taken between two different "seated" conditions, with the original dimension being taken prior to loosening of the head 33b and with the second dimension being taken following retightening of the same.

It will further be seen that during such movement of the bolt 33, there will be non-rotational movement of the body 30 due to the fact that the same is a square shank received within the square opening 22. Similarly, it will be seen that when the bolt 33 is drawn up there will be a radial collapse of the lower portion of the adjustment nut 31 and this radial collapse will operate to firmly grasp the tool 30 so that the same is, in fact, seated with respect to the boring bar 12. This is in distinct contrast to the conventional prior art devices wherein the nut 31 merely is employed for adjustment purposes, with the result that the projecting end of the tool body 30 is subject to chattering and is loosely supported with the only point of support in such prior art devices being adjacent the head 33b.

It will be seen from the foregoing that there has been provided a new and improved type of boring bar tool that is characterized by the fact that the same is easily and readily adapted to use with conventional boring bar tools now in existence. It has been shown how the improved boring bar tool, in addition to being simple in installation, is highly efficient in view of the fact that there are two points of support of the tool with respect to the boring bar at axially separated points in the bore thereof with the result that a more rigid type of cutting tool is provided.

It has been further shown how the improved tool is easily and accurately adjusted and how all adjustments are accurate by virtue of the fact that the same are taken between two seated conditions of the tool bit with respect to the boring bar.

While a full and complete description of the invention has been set forth in accordance with the dictates of the patent statutes, it is to be understood that the invention is not intended to be so limited.

Accordingly, while the invention contemplates the use of the conventional tool steels employed as illustrated, it is to be understood that equivalent materials could be substituted without obtaining an unexpected change in result and, similarly, while various contours and configurations have been set forth specifically for description purposes, it is to be understood that the invention is not intended to be limited to the particular configurations employed. Thus, for example, it is believed that, if desired, the counterbore 21 could be eliminated and washer 32 applied against the surface of bar 12.

Accordingly, modifications of the invention may be resorted to without departing from the spirit hereof or the scope of the appended claim.

What is claimed is:

A micrometrically adjustable boring bar unit of the character described, comprising; a boring bar having an axis of rotation and a bore extending transversely thereof; a radially outwardly flaring tapered seat contiguously adjoining one axial end of said bore; a cutter bar slidably received in said bore in non-rotatable relationship therewith; a radially collapsible adjustment nut encircling said cutter bar and being disposed adjacent said tapered seat and having a plurality of axial slits in the conical portion thereof; the angle of taper of said adjustment nut being different than the angle of taper of said tapered seat; means operable between said cutter bar and said adjustment nut and shifting said cutter bar axially of said bore and upon rotation of said nut around said cutter bar; said bore and said cutter bar being of complemental, substantially square cross section with the longitudinal edges of said cutter bar being provided with threads substantially throughout its longitudinal dimension that make the threads provided on said adjustment nut; the surfaces intermediate said threads provided on said longitudinal edges of said cutter bar being flat substantially throughout its longitudinal dimension and being engaged with the walls of said bore, whereby the same may be shiftable longitudinally thereof; and second means supporting said cutter bar at one end with respect to said boring bar and being operable to draw said nut into seated engagement with said seat and subsequently radially collapse said nut on said cutter bar, whereby said nut will be locked against rotation relatively of said boring and cutter bars during seated condition thereof.

References Cited in the file of this patent

UNITED STATES PATENTS

| | | |
|---|---|---|
| 2,163,677 | Goeller | June 27, 1939 |
| 2,448,902 | McKenzie | Sept. 7, 1948 |
| 2,524,374 | Briney | Oct. 3, 1950 |
| 2,537,517 | De Vlieg | Jan. 9, 1951 |
| 2,564,511 | Smith | Aug. 14, 1951 |
| 2,652,634 | De Vlieg | Sept. 22, 1953 |
| 2,690,201 | Fineran | Sept. 28, 1954 |
| 2,913,935 | Flannery | Nov. 24, 1959 |